United States Patent [19]
Liu

[11] Patent Number: 5,966,935
[45] Date of Patent: Oct. 19, 1999

[54] POWER GENERATING DEVICE

[76] Inventor: Shih-Chen Liu, 3F, No. 216, Yung Feng Rd., Tu Cheng City, Taipei Hsien, Taiwan

[21] Appl. No.: 09/004,425

[22] Filed: Jan. 8, 1998

[51] Int. Cl.$^6$ ..................................................... F16D 31/02
[52] U.S. Cl. .................................. 60/413; 60/420; 60/484
[58] Field of Search .............................. 60/413, 420, 484

[56] References Cited

U.S. PATENT DOCUMENTS

| | | | |
|---|---|---|---|
| 4,215,545 | 8/1980 | Morello et al. ............................. | 60/413 |
| 4,242,922 | 1/1981 | Baudoin ................................ | 60/413 X |
| 4,370,857 | 2/1983 | Miller ........................................ | 60/413 |
| 5,271,225 | 12/1993 | Adamides ............................... | 60/413 X |

*Primary Examiner*—Hoang Nguyen
*Attorney, Agent, or Firm*—Burns, Doane, Swecker & Mathis, L.L.P.

[57] ABSTRACT

The present invention provides a novel power generating device, wherein the rotary inertial force of a fly wheel cooperating with a pneumatic auxiliary power apparatus is employed to maintain that the fly wheel rotates continuously and acceleratingly and outputs power. The part of the output force of the fly wheel is used to drive an air compressor for generating compressed air, to be input into a pneumatic motor of the pneumatic auxiliary power means so that the output power of the pneumatic motor is fed back to the fly wheel in order that the fly wheel maintains the inertial force to rotate continuously. The fly wheel also drives a cam type control apparatus so to control the compressed air that it supplies intermittently to the pneumatic motor for driving the fly wheel. Additionally, the fly wheel is preferably mounted with a weight, and a compensation device for beating the fly wheel in order to increase inertial torque each time when the weight rotates to a predetermined angle. Initially the fly wheel is actuated by the drive of power sources such as a motor or an engine, and next through driving apparatus to drive an air compressor until the fly wheel has reached to a predetermined rotary speed and the pressure of the compressed air stored within the air compressor has reached to a predetermined value, then the power source separates from the system and the fly wheel now continues to rotate by its rotary inertial force and the auxiliary power apparatus and produces power. With the device of the present invention it is possible to save energy and to eliminate public nuisance.

7 Claims, 4 Drawing Sheets

POWER GENERATING DEVICE

BACKGROUND OF THE INVENTION

1. Field of the Invention

The present invention relates to a novel power generating device and especially to a power generating device, whereby in cooperation with a pneumatic auxiliary power means driven by an air compressor the inertial force of fly wheel is used to maintain the fly wheel in continuous accelerating rotation and so to further generate an output of power.

2. Description of the Prior Art

The well-known conventional power generating device includes motors driven by electric power, internal combustion engines or external combustion engines driven by combustion energy of fuels, pneumatic motors driven by air pressure, hydraulic motors driven by hydraulic pressure, water mills driven by water and wind mills driven by wind. In said various power generating devices, except for those which use water power and wind power as energy source to drive, all others still consume continuously much energy in operation, such as electric power, powers from oil, coal and other fuels. Although the water and wind mills do not waste said energy sources, but they are confined by terrain, and occupy larger spaces volume. Therefore, the cost of equipment is expensive.

Recently, some generator by using solar power or tide or sea wave has been developed. However, such kinds of devices are also limited by terrain and climate, and the volume occupied is also large and the cost needed is very expensive.

Additionally, said power generating apparatuses driven by oil and coal will induce air pollution and other public harmful problems.

Therefore, it is important to provide a power generating device which consumes less energy, is not expensive and not confined by terrain, climate and space, and is easy to be controlled and widely used as required and expected by those skilled in the art.

SUMMARY OF THE INVENTION

Accordingly, an object of the present invention is to provide a novel power generating device which is developed for solving said question in the prior art, wherein the rotating inertial force of a fly wheel in cooperation with a pneumatic auxiliary power means is used to maintain the fly wheel to rotate continuously for power output.

Another object of the present invention is to provide a power generating device, wherein only a small actuating power and a prestored compressed air are required to maintain the rotation of the fly wheel. After the fly wheel has reached to a predetermined rotary speed for rotating, it may retain its rotation continuously by the inertial force thereof and by the auxiliary driving force generated by the auxiliary power means which is pneumatically driven by the feedback of the compressed air.

A further object of the present invention is to provide a power generating device, wherein a weight is appended to the outer rim of the side face of the fly wheel for increasing the output torque, and further installed with a fly wheel compensation means which is used to drive the fly wheel intermittently for increasing the rotary force of the fly wheel and compensating loss of the negative gravitational force of said weight.

A further object of the present invention is to provide a power generating device for maintaining the fly wheel to rotate continuously, and by this power generating device, the volume of the input of compressed air from the accelerated pneumatic motor may be automatically adjusted according to the rotation variation of the fly wheel.

A further object of the present invention is to provide a power generating device which has a simple structure and is a power saving device without pollution, and is thus adapted for a wide use in many fields.

BRIEF DESCRIPTION OF THE DRAWINGS

The present invention will be better understood and its numerous objects and advantages will become apparent to those skilled in the art by referencing to the following drawings, in which.

DETAILED DESCRIPTION OF THE PREFERRED EMBODIMENT

Figure 1:
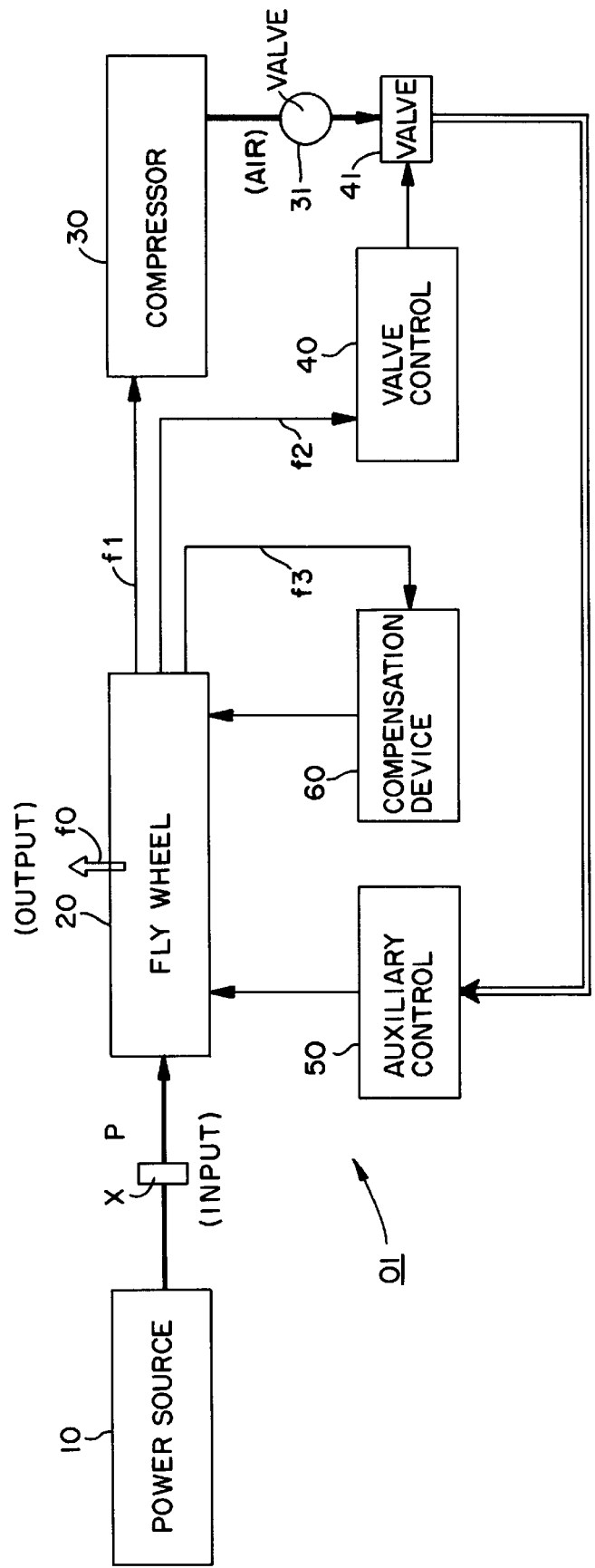
FIG. 1 is a block diagram showing the principle of construction of the power generating device of the present invention.

Referring now to FIGS. 1, a diagram depicting the principle of construction of the power generating device of the present invention is shown.

The reference numeral 01 represents the power generating device of the present invention which mainly comprises: an actuating power source 10, a fly wheel 20, an air compressor 30, an air valve control means 40, a pneumatic auxiliary power means 50, and a fly wheel compensation device 60.

A appropriate coupling means X is used to dynamically separably connect the power source 10 with fly wheel 20, thus the output power P generated by the power source 10 is directly transmitted to the fly wheel 20. A part of output power f1 of the fly wheel 20 is transmitted to the air compressor 30 for generating compressing air. After the air has been stored to a predetermined pressure, it is inputted to the pneumatic auxiliary power means 50 through a control valve 41 which is controlled by the air valve control means 40 driven by a small part f2 outputted from the fly wheel 20 so to produce an auxiliary torque to help drive the fly wheel 20. On the other side, a part of output f3 of the fly wheel 20 is inputted to the compensation device 60 to generate an intermittent impact force to feed back to the fly wheel 20. The main output power f0 of the fly wheel 20 is used to work.

When the above said power generating device 01 is actuated, the side output valve 31 of the air compressor 30 is first closed, and then the power source 20 is actuated to drive the fly wheel 20, air compressor 30 and even the other devices 40, 50, and 60. After the rotary speed of the fly wheel 20 has attained a set value, at the same time, the air compressor 30 has stored an enough pressure, the power source 10 will separate from the fly wheel 20 by the coupling means X, then the operation of the power source is stopped and the valve 31 is open simultaneously. At this time the fly wheel 20 continues to rotate by the inertial force of its own, but the speed thereof will decrease gradually, while the compressed air stored within the air compressor 30 is released intermittently to the pneumatic auxiliary power means 50 for generating power to maintain the accelerating rotation of the flywheel 20 uninterruptedly. At the same time, the compensation device 60 also drives the fly wheel 20 intermittently to promote the running power of the fly wheel 20, so that the fly wheel 20 rotates continuously and outputs power f0. At this time, the consumed compressed air supplied by the air compressor 30 for use by the pneumatic auxiliary power means 50 is replenished by outer air sucked and compressed by the air compressor 30 driven by a part of power f1 of the flywheel 20. In the operation, as a rule, the total output of the fly wheel 20 is P=f0+f1+f2+f3, and f0>f1+f2+f3. This will be described hereinafter.

Figure 2:
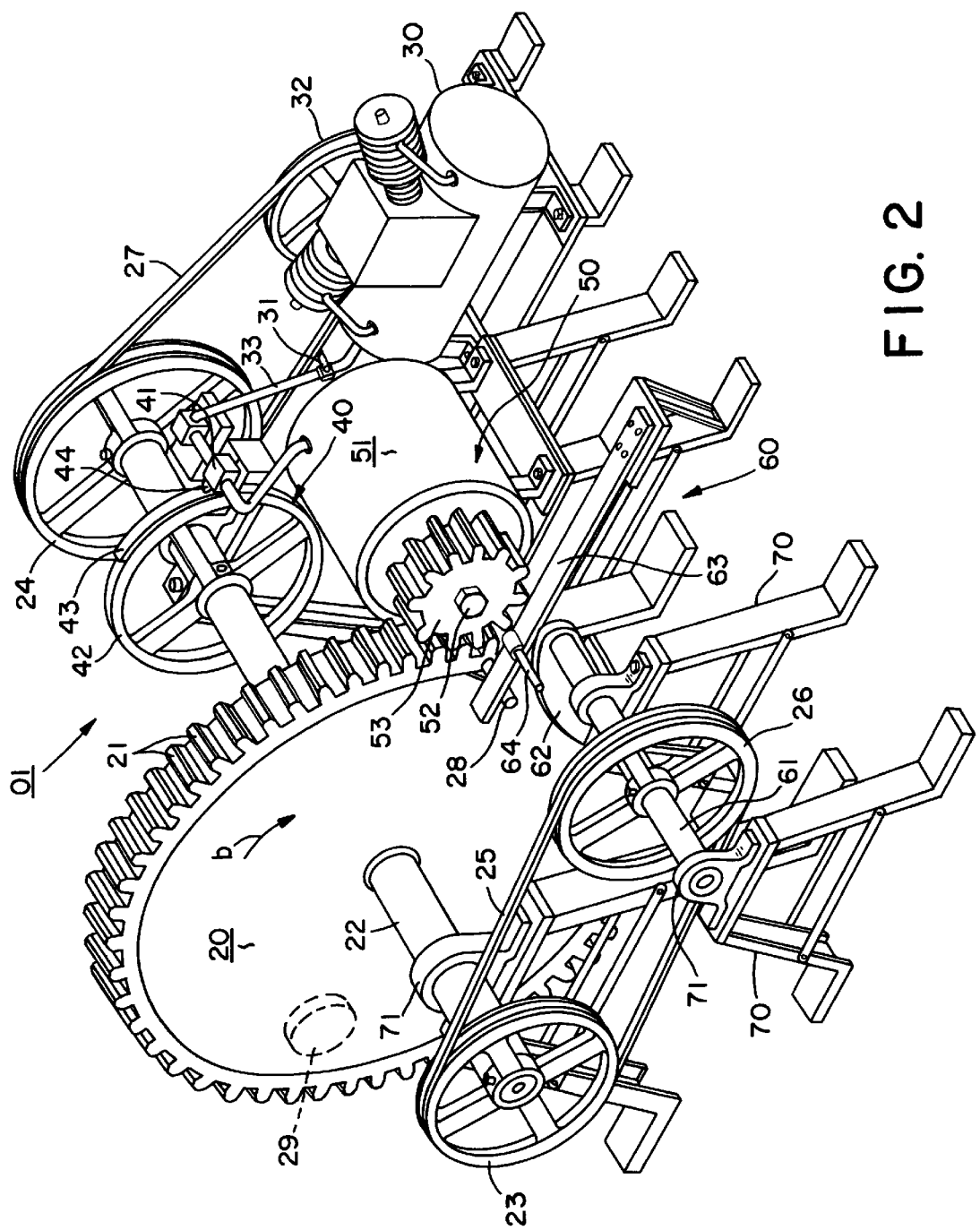
FIG. 2 is a perspective view of one embodiment of the power generating device of the present invention.
Figure 3:
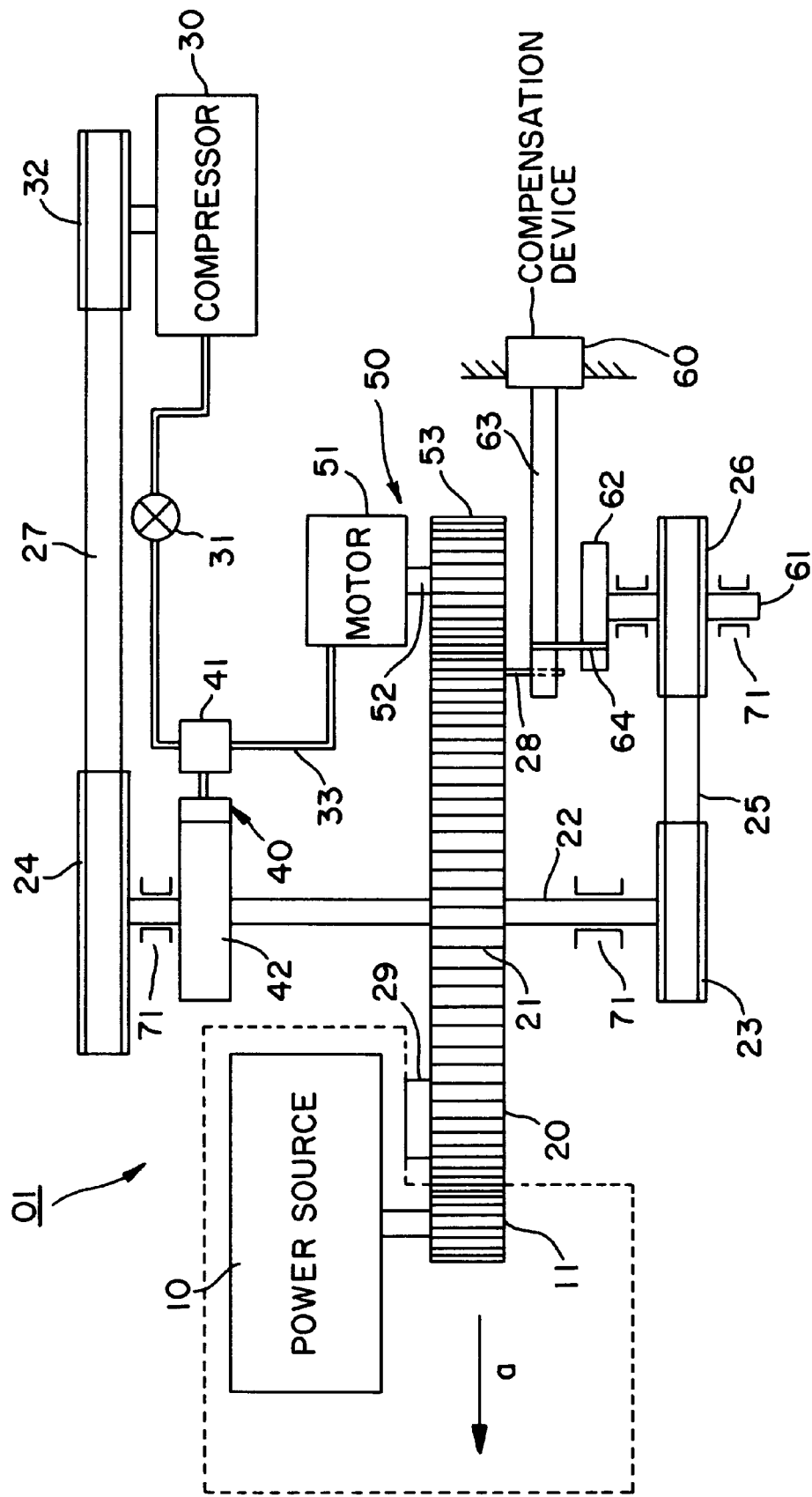
FIG. 3 is the a flow diagram showing the mechanical power transmission shown in FIG. 2.

In order to embodying said structure, FIG. 2 shows an embodiment of the practical structure.

From the drawing, there is shown that the power generating device 01 of the present invention has a large diameter fly wheel 20 having the circular rim formed in a gear 21 and the center of which is penetrated through a main shaft 22 and is rotatably supported on a frame 70 by bearing 71. This fly wheel 20 is driven to rotate by the output gear 11 engaged with the power source 10 of the fly wheel 20. This power source 10 is the external force actuating mechanism supplying actuation force to the fly wheel 20 and all the other active devices including the air compressor 30 to be described hereinafter. Depending on the required size of the total output power of the power generating device 01, the size and weight of the fly wheel 20, the type of the energy source used, etc., one may select a generally used engine or electric motor or even other power sources such as water power or wind power. If it is a small size means and the required output power is small, then an output gear 11 rotated by hand through a crank may also do; however, in general use of a motor or engine is more appropriate. As the pressure of the air compressor 30 has reached a predetermined pressure and the rotary speed of the fly wheel 20 has increased to a set value, the power source 10 and the gear 11 become separated from the driving system in the direction indicated by the arrow a. Means to separate the gear 11 (power source 10) from the fly wheel 20 may follow, for example, the whole power source 10 is moved some distance with respect to the seat so that the gear 11 is separated from a slider engaged with the fly wheel 20, or clutch means or other devices well known by those skilled in the art.

A first belt pulley 23 with a small diameter is fixed on one end of the main axis 22, and a second belt pulley 24 having a diameter larger than that of the first belt pulley 23 is fixed on the other end thereof, while a control cam 42 forming an air valve control means 40 is fixedly installed between the second belt pulley 24 and the fly wheel 20. The first belt pulley 23 may drive the belt pulley 26 rotatably supported on the secondary shaft 61 of the frame 70 by a bearing 72 through a belt 25, and the compensation device 60 is actuated by the belt pulley 26, to be described hereinafter. On the other hand, the second belt pulley 24 drives the input belt 32 of the air compressor 30 by the belt 27. The high pressure air generated by the air compressor 30 is supplied to the pneumatic motor 51 of the auxiliary power means 50 through a line 33 for generating a torque to the gear 53 on the motor shaft 52 of the motor, then the torque will be transferred to the fly wheel 20 by said gear 53 for driving the fly wheel 20 to rotate. The transmission means of said belts 25 and 27 and said belt pulleys 23, 24, 26 and 32, preferably, use synchronous belt drive devices with teeth to prevent sliding.

Figure 4:
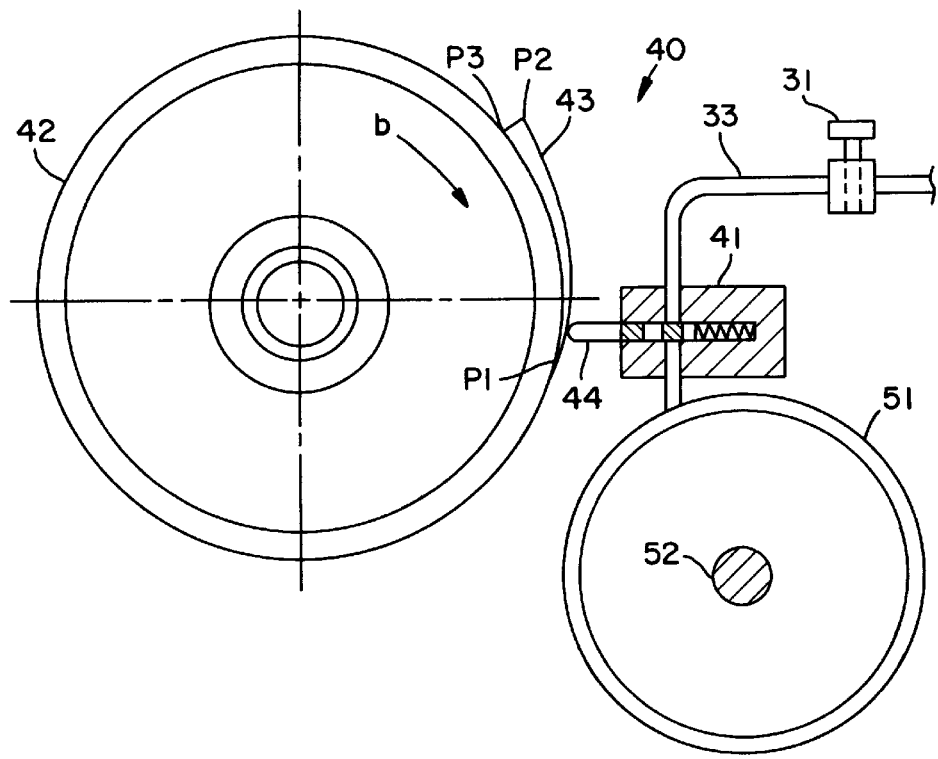
FIG. 4 is an illustration showing the control device of the compressed air valve.

At the upper reach of the line 33 there is mounted a valve 31 for opening and closing of the line and at the lower reach thereof there is located a normally closed control valve 41. The switching of the control valve 41, as shown in FIG. 4, is controlled by the control cam 42 of the air valve control means 40. Apparently, this cam 42 has a projecting portion 43 from lower end to higher end, while the control valve 41 has an operating rod 44 for opening and closing the inner air passage hole, the outer end of which is in contact with the projecting portion 43.

When the cam 42 rotates along with the flywheel 20 in the direction of arrow b, the operating rod 44 is pushed and pressed to move gradually and upwardly from a lower point P1, i.e., valve completely closed position, to a higher point P2, i.e., valve completely open position,, and then it is again descended from point P2 to a point P3 on the same diameter as P1 so to be restored to the original valve closed position until in the following rotation, the P1 reaches the operating rod 44 and the valve opening and closing operation is repeated. Thus during the time period of opening the control valve 41, i.e. during the time period that it is moved from the point P1 to P2 along the peripheral surface of the cam 42, the compressed air enters into the pneumatic motor 51 of the pneumatic auxiliary power means 50 through the valve 41 to rotate the motor and through the gear 53 the torque is transmitted to the fly wheel 20. For said pneumatic motor 51, a known pneumatic motor, such as: a pneumatic driver, or a pneumatic spanner may be used, which will not be described again.

Figure 5:
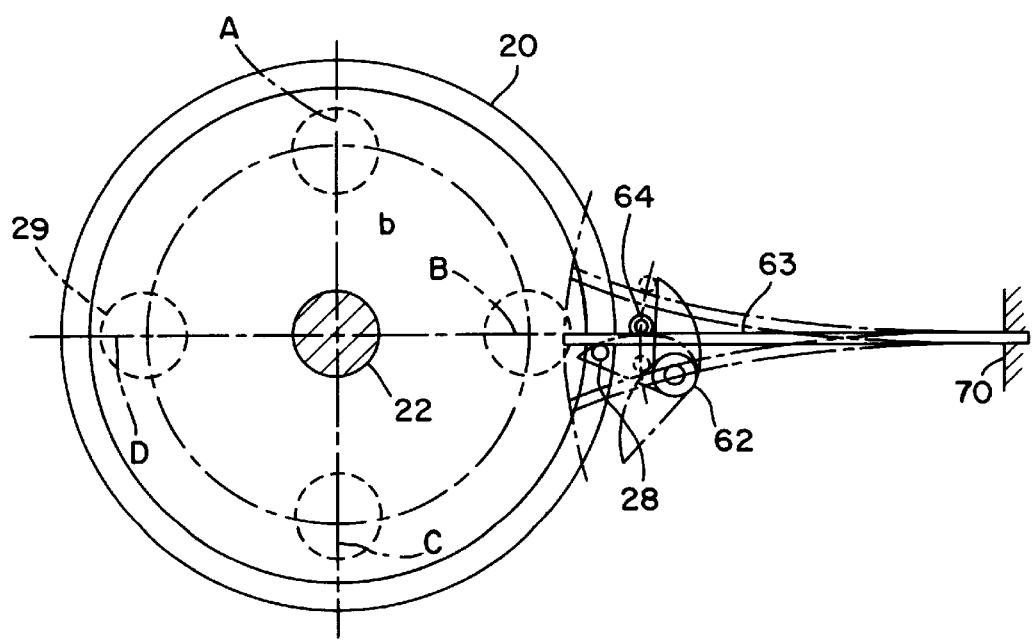
FIG. 5 is a schematic diagram showing the relation between the auxiliary power means and the fly wheel.

In addition, the compensation device 60 is rotated synchronously with the fly wheel 20 through the first belt pulley 23, the belt 25 and the working belt pulley 26 having the same diameter as the first belt pulley 23 . The compensation device 60 comprises a cam 62 fixed on the inner end of the secondary shaft 61 and a spring member 63, such as an elastic steel plate, operated with the cam 62. In this embodiment, the spring member 63 has a long strip shape, one end of which is fixed to a predetermined position on the frame 70 and the other end is formed with a free end extending to the front side of the fly wheel 20 and beyond to the rotation axis track of the projecting rod 28 on the outer front end of the fly wheel 20. A working roller 64 extending outwards and capable of working the cam 62 is installed on the rotation track of the near front end of the elastic component 63 on the cam 62. This compensation device 60 is used to overcome the negative torque of the weight 29 installed on the fly wheel 20 for increasing the output torque thereof, thus the relation between the weight 29 and the projecting rod 28 and the compensation device 60 is maintained as shown in FIG. 5. In a detail description, the weight 29 and the projecting rod 28 are located on the same diameter of the fly wheel 20, i.e. they are located on the outermost end separated by an angle of 180 degrees. When the weight 29 is rotated along the inertial direction from the topmost position A of the fly wheel 20 slightly towards the right direction shown in the figure. It then drops down straightly to the position of the lowermost point C by its own gravitational force W and the inertial force M of the fly wheel 20 through the middle position B. In a static condition according to the theory of pendulum, as the weight 29 is descended from point B (90 degrees) position, it will rotate to the C position ( i.e. 270 degrees position), the weight 29 will generate a negative torque to be in a position of swinging again in an opposite direction, that is, in a position that the fly wheel 20 slows down in speed. However, slightly prior to this time point, the cam 62 already beginning to operate on a predetermined angle θ has already pushed the spring member 63 upwardly to a highest point. At the same time, the projecting rod 28 also rotates appropriately to the position underneath the spring member 63 as shown by the imaginary line shown in FIG. 5. Thereafter, the acting surface of the cam 62 turns away from the spring member 63 and the latter is lowered abruptly by elastic return force to beat heavily the projecting rod 28. As a result, an impact force larger than the negative torque of the weight 29 is generated. Moreover, since the fly wheel 20 possesses an inertial impaction force not in the static condition but is during the rotation, the fly wheel therefore not only is capable of maintaining rotation continuously, but is also able to accumulate surplus energy from the impact force following each rotation to bestow upon the fly wheel 20, thus the running speed of the fly wheel 20 will increase and meanwhile there will be an increase in forces too.

When the projecting rod 28 is struck down by the spring member 63 to the imaginary line position at the lower portion of FIG. 5, the cam 62 immediately pushes the spring member 63 upwards again to wait until in the next rotation, the projecting rod 28 again enters into its lower position X, to perform the second cycle of action that the spring member strikes heavily the projecting rod 28 again.

An embodiment of the basic structure of the present invention has been described in the above. In the following, the operation condition thereof will be described in detail.

Firstly, after the output valve 31 is closed, the power source 10 is actuated, then the fly wheel 20 is driven to rotate by the power source 10 through the gear 11. After the fly wheel is rotated, the belt pulleys 23 and 24 and the cam 42 are also brought to rotate through the intermediary of the main shaft 22. Therefore, the air compressor 30 is brought to action through the drive of the belt pulley 24, the belt 27 and the belt pulley 32 so to generate compressed air, meanwhile, the belt pulley 23 drives the belt pulley 26 through the belt 25 and next further through the cam 62 of the pneumatic compensation device 60 driven by the secondary shaft 61. On the other hand, the cam 42 brings air valve control device 40 into action, since now the valve 31 is closed, and no compressed air flows within the pipe line, thus there is no output from the pneumatic motor 51, therefore, the gear 53 is rotated idly through the drive of the fly wheel 20.

When the speed of the fly wheel 20 has reached an expected rate of rotation and the air compressor 30 has stored full of the compressed with to a predetermined pressure, the power source 10 is moved away from the fly wheel 20 and the operation of the power source is stopped. Next, the valve 31 is opened, the compressed air flows into the pneumatic motor 51 through the pipe line 33 and the control valve 41 to drive the gear 53 to rotate. Therefore, the gear 53 changes from the originally passive to the now active state to drive the fly wheel 20, which still rotates by the original inertial force, to rotate continuously, the fly wheel 20 can thus output power from the main shaft 22. During the rotation of the fly wheel 20, the air valve control means 40 induces the actuating rod 44 by cam 42 once for opening the control valve 41 every one rotation cycle of the fly wheel 20. After rotating through a cambered length of the cam portion 43 (in this embodiment it is approximately of one quarter length of the circumference), the valve 41 is closed. In this way, the compressed air is supplied intermittently to the pneumatic auxiliary power means 50 and the consumption rate is therefore less. Also, the opening time of the valve 41 changes along with the rotary speed of the fly wheel 20, i.e. if the rotary speed is large, the opening time is short, and if the rotary speed is slow, the opening time is long. Thus the air supply of the compressed air may be adjusted automatically by the rotary speed of the fly wheel 20, accordingly, the fly wheel 20 may be maintained to rotate with an substantially equal speed. When the rotary speed of the fly wheel 20 is slowed due to large load or when the rotary speed of fly wheel 20 is increased due to small load or no load, the opening of the main valve 31 may be adjusted manually or by an automatic control device linking with the output so that the fly wheel 20 rotates with a required rotary speed.

Alternatively, as the fly wheel 20 is rotated as described above, the cam 62 pushes the spring member 63 upwardly once in every one rotation cycle of the fly wheel 20 and then the spring member 63 is lowered abruptly to strike heavily the projecting rod 28 at the side of the fly wheel 20 so to give impact force to the fly wheel 20 in according with the weight 29. This impact force is converted into the torque of the fly wheel 20 thereby enabling the fly wheel 20 to output an even larger torque.

Since during the rotation of the fly wheel 29, the air compressor 30 is running continuously to suck in air for compressing and to replenish the amount of the compressed air consumed by the pneumatic motor 51, the fly wheel 20 can thus operate for a long time. If the rotation of the fly wheel 20 is to be stopped, this can be done by switching off the valve 31 to stop the supply of the compressed air. When the fly wheel 20 is to be operated again, it only needs to actuate by the power source 10 briefly and to repeat the above said actions.

In the aforementioned embodiment, the compensation device 60 uses the spring member 63 driven by the cam 62, but obviously, a helical spring, or a member formed by a helical spring and a compacting rod may be used as substitute for said spring member 63.

Again, a gear 21 is formed on the outer periphery of the fly wheel 20, however, the gear 21 and the fly wheel 20 may be initially formed separately and then they are combined together as one body.

Since the components of the present invention are power-saving, there is no pollution, and since the construction is simple, it is thus easy to manufacture and is not expensive. Therefore, the present invention has a powerful usage in industry.

While the present invention has been described in connection with what is considered the most practical and preferred embodiment, it is understood that this invention is not limited to the disclosed embodiments but is intended to cover various arrangements included within the spirit and scope of the broadest interpretation so as to encompass all such modifications and equivalent arrangements.

What is claimed is:

1. A power generating device comprising:
    a power source for initially driving the power generating device and being thereafter separable from the power generating device;
    a fly wheel which is driven by said power source in actuation and then rotated by the drive of the inertial force itself and the compressed air so as to output power;
    an air compressor driven by said fly wheel and in actuation to be driven by said power source to store enough needed pressure, and which includes pneumatic valve control means such that, when the power source stops driving the air compressor, the air compressor releases compressed air intermittently to supply a pneumatic auxiliary power means intermittently;
    the pneumatic valve control means being rotated synchronously with said fly wheel and intermittently opening and closing the compressed air transfer pipeline between the air compressor and a pneumatic auxiliary power means; and pneumatic auxiliary power means including a pneumatic motor, used to control circling of the supplied compressed air by said air compressor through said pneumatic valve control means of the pipeline for driving the fly wheel.

2. The power generating device as recited in claim 1, wherein said fly wheel has a gear with substantially same diameter.

3. The power generating device as recited in claim 1, wherein said air compressor is driven to rotate by a belt pulley mounted on the main shaft of said fly wheel and rotating synchronously with said fly wheel.

4. The power generating device as recited in claim 1, wherein said pneumatic valve control means is formed by a cam installed on the main shaft of said fly wheel and rotating synchronously with said fly wheel, and a control valve disposed on the compressed air pipeline and performing intermittent opening and closing movement by the action of said cam.

5. The power generating device as recited in claim 1, wherein said pneumatic valve control means is formed by the pneumatic motor and a pinion installed on the output shaft of said pneumatic motor and engaged with the gear or said fly wheel.

6. The power generating device as recited in claim 1, wherein a weight is further installed on one side of said fly wheel near the outer periphery.

7. The power generating device as recited in claim 1, wherein said power generating device is further installed thereon with a compensation device, said compensation device comprising: a cam mounted on the secondary shaft and driven by a belt pulley drive means to rotate synchronously with the fly wheel, and a spring member intermittently driven by said cam for storing elastic energy so that it may release this elastic energy in a proper time to heavily hit a force bearing means on said fly wheel, thereby conferring upon said fly wheel and even larger torque.

\* \* \* \* \*